(12) United States Patent
Nakagawa et al.

(10) Patent No.: US 12,108,240 B2
(45) Date of Patent: Oct. 1, 2024

(54) ACOUSTIC PROCESSING APPARATUS, ACOUSTIC PROCESSING METHOD, AND ACOUSTIC PROCESSING PROGRAM

(71) Applicant: Sony Group Corporation, Tokyo (JP)

(72) Inventors: Toru Nakagawa, Chiba (JP); Koyuru Okimoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 449 days.

(21) Appl. No.: 17/438,358

(22) PCT Filed: Mar. 3, 2020

(86) PCT No.: PCT/JP2020/008997
§ 371 (c)(1),
(2) Date: Jun. 3, 2022

(87) PCT Pub. No.: WO2020/189263
PCT Pub. Date: Sep. 24, 2020

(65) Prior Publication Data
US 2022/0312143 A1  Sep. 29, 2022

(30) Foreign Application Priority Data

Mar. 19, 2019  (JP) ................................. 2019-051931

(51) Int. Cl.
*H04S 7/00*  (2006.01)
(52) U.S. Cl.
CPC .............. *H04S 7/304* (2013.01); *H04S 7/306* (2013.01); *H04S 2400/11* (2013.01); *H04S 2400/15* (2013.01); *H04S 2420/01* (2013.01)

(58) Field of Classification Search
CPC ...... H04S 7/304; H04S 7/306; H04S 2400/11; H04S 2400/15; H04S 2420/01
(Continued)

(56) References Cited

U.S. PATENT DOCUMENTS 9,396,588 B1   7/2016 Li
2006/0050909 A1   3/2006 Kim
(Continued)

FOREIGN PATENT DOCUMENTS

CN   106576203 A   4/2017
CN   108605193 A   9/2018
(Continued)

OTHER PUBLICATIONS

International Search Report and English translation thereof mailed Apr. 7, 2020 in connection with International Application No. PCT/JP2020/008997.
(Continued)

*Primary Examiner* — Vivian C Chin
*Assistant Examiner* — Con P Tran
(74) *Attorney, Agent, or Firm* — Wolf, Greenfield & Sacks, P.C.

(57) ABSTRACT

An acoustic processing apparatus (1) according to the present disclosure includes an acquisition unit (41), a storage unit (3), and a processing unit (42). The acquisition unit (41) acquires location information regarding a location viewed by a user who listens to an acoustic content. The storage unit (3) stores acoustic information (34) regarding acoustics at the location. The processing unit (42) converts an acoustic characteristic of the acoustic content into an acoustic characteristic in accordance with the location on the basis of the acoustic information (34) and regenerates a sound field.

17 Claims, 12 Drawing Sheets

(58) Field of Classification Search
USPC .............. 381/303, 310, 306, 74; 345/633, 7;
386/240, 239; 700/94
See application file for complete search history.

(56) References Cited

U.S. PATENT DOCUMENTS

| | | |
|---|---|---|
| 2008/0243278 A1 | 10/2008 | Dalton |
| 2015/0256598 A1* | 9/2015 | Walker ................... H04L 43/087 709/217 |
| 2016/0191893 A1* | 6/2016 | Gewickey ............ H04N 13/344 386/234 |
| 2017/0347219 A1 | 11/2017 | Mccauley |
| 2018/0091921 A1* | 3/2018 | Silva ........................ G06T 17/20 |
| 2018/0109900 A1 | 4/2018 | Lyren |
| 2019/0335287 A1* | 10/2019 | Jung ........................ H04N 7/157 |
| 2020/0137508 A1* | 4/2020 | Lee ........................ H04S 3/008 |

FOREIGN PATENT DOCUMENTS

| | | |
|---|---|---|
| EP | 3554098 A1 | 10/2019 |
| JP | 2015-171111 A | 9/2015 |
| JP | 2017-175458 A | 9/2017 |
| KR | 20140129654 A | 11/2014 |
| KR | 20180044077 A | 5/2018 |
| WO | WO-2006009004 A1 | 1/2006 |
| WO | WO-2014069661 A1 | 5/2014 |
| WO | WO 2017/175458 A1 | 10/2017 |
| WO | WO-2017205637 A1 | 11/2017 |
| WO | 2018/110269 A1 | 6/2018 |

OTHER PUBLICATIONS

International Written Opinion and English translation thereof mailed Apr. 7, 2020 in connection with International Application No. PCT/JP2020/008997.
International Preliminary Report on Patentability and English translation thereof mailed Sep. 30, 2021 in connection with International Application No. PCT/JP2020/008997.
Extended European Search Report issued Aug. 9, 2022 in connection with European Application No. 20774002.8.

* cited by examiner

FIG. 4

| USER ID | HRTF | LOCATION | VR VIDEO | ACOUSTIC PARAMETER | | |
|---|---|---|---|---|---|---|
| | | | | SOUND OUTPUT LOCATION | REVERBERATION PERIOD | REFLECTION COEFFICIENT |
| ⋮ | ⋮ | ⋮ | ⋮ | ⋮ | ⋮ | ⋮ |
| A01 | B01 | C01 | D01 | E01 | F01 | G01 |
| | | | | E02 | F02 | G01 |
| | | | | ⋮ | ⋮ | ⋮ |
| ⋮ | ⋮ | ⋮ | ⋮ | ⋮ | ⋮ | ⋮ |

ACOUSTIC PROCESSING APPARATUS, ACOUSTIC PROCESSING METHOD, AND ACOUSTIC PROCESSING PROGRAM

CROSS-REFERENCE TO RELATED APPLICATIONS

This application claims the benefit under 35 U.S.C. § 371 as a U.S. National Stage Entry of International Application No. PCT/JP2020/008997, filed in the Japanese Patent Office as a Receiving Office on Mar. 3, 2020, which claims priority to Japanese Patent Application Number JP2019-051931, filed in the Japanese Patent Office on Mar. 19, 2019, each of which is hereby incorporated by reference in its entirety.

TECHNICAL FIELD

The present disclosure relates to an acoustic processing apparatus, an acoustic processing method, and an acoustic processing program.

BACKGROUND ART

There are sound field sound collection generation apparatuses that drive a speaker with a drive signal generated by using a wavefront synthesis method from sound field signals that have been collected by a plurality of microphones so as to virtually reproduce the sound field at the sound-collected location (for example, see Patent Document 1).

CITATION LIST

Patent Document

Patent Document 1: Japanese Patent Application Laid-Open No. 2015-171111

SUMMARY OF THE INVENTION

Problems to be Solved by the Invention

Only the reproduction of the sound field, however, cannot give a sufficient realistic feeling to a listener who is listening to acoustics, in some cases. Therefore, the present disclosure proposes an acoustic processing apparatus, an acoustic processing method, and an acoustic processing program, which are capable of enhancing the realistic feeling given to the listener who is listening to acoustics.

Solutions to Problems

An acoustic processing apparatus according to the present disclosure includes an acquisition unit, a storage unit, and a processing unit. The acquisition unit is configured to acquire location information regarding a location viewed by a user who listens to an acoustic content. The storage unit is configured to store acoustic information regarding acoustics at the location. The processing unit is configured to convert an acoustic characteristic of the acoustic content into an acoustic characteristic in accordance with the location on the basis of the acoustic information, and is configured to regenerate a sound field.

BRIEF DESCRIPTION OF DRAWINGS

FIG. 4 is an explanatory diagram showing an example of acoustic information according to the present disclosure.

MODE FOR CARRYING OUT THE INVENTION

Figure 1:
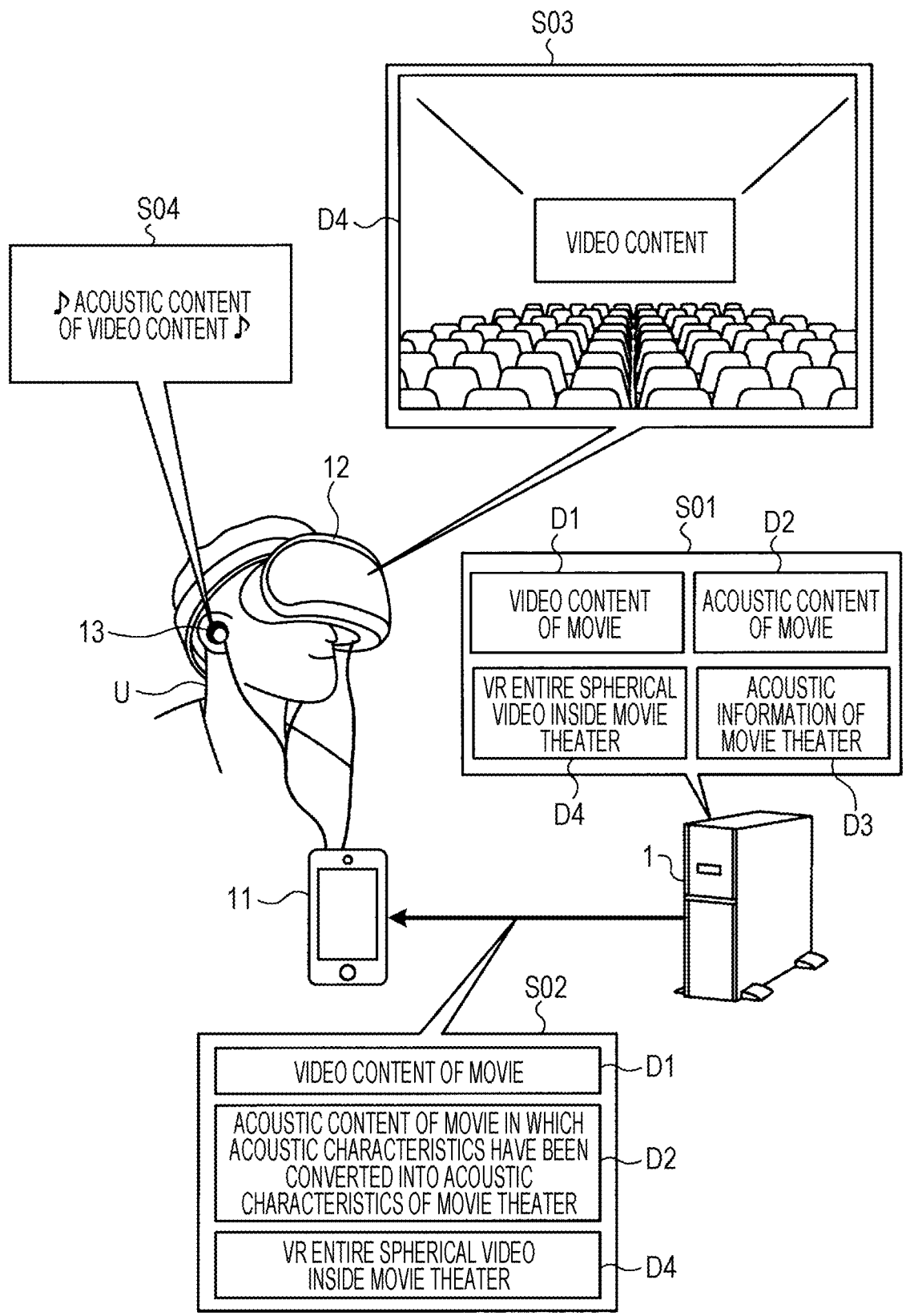
FIG. 1 is an explanatory diagram showing an outline of an acoustic process by an acoustic processing apparatus according to the present disclosure.

Hereinafter, embodiments of the present disclosure will be described in detail with reference to the drawings. It is to be noted that in each of the following embodiments, the same parts are designated by the same reference numerals, so that duplicate description will be omitted.

(1. Outline of Acoustic Process)

FIG. 1 is an explanatory diagram showing an outline of an acoustic process by an acoustic processing apparatus 1 according to the present disclosure. The acoustic processing apparatus 1 is an apparatus that converts acoustic characteristics of an acoustic content such as a movie, a live music performance, a promotional video of a music piece, a television program, a music piece, or the like into acoustic characteristics of a sound-recorded location, so as to regenerate a sound field while reproducing the sound field of a sound-recorded location.

Here, the acoustic processing apparatus 1 cannot give a sufficient realistic feeling to a listener of the acoustic content only by reproducing the sound field of the sound-recorded location, in some cases. Specifically, in a case where a measurement location where the acoustic characteristics of the acoustic content are measured and a regeneration location of the acoustic content are the same, the acoustic processing apparatus 1 is capable of giving the listener as if the listener were staying at the location. However, in other cases, the realistic feeling is reduced by half.

For example, even in a case where the acoustic processing apparatus 1 provides a user who views and listens to a movie at home with an acoustic content of the movie in which a reverberation characteristic, an echo characteristic, and the like of a movie theater are reproduced and converted into acoustic characteristics, it is difficult to give the user the feeling of staying in a movie theater, because the staying location of the user is a user's house.

Hence, the acoustic processing apparatus 1 utilizes, for example, a technology such as virtual reality (hereinafter, referred to as VR: Virtual Reality) to reproduce the measurement location where acoustic information of the acoustic content has been measured, and then regenerates the sound field of the acoustic content in which the acoustic characteristics of the measurement location have been reproduced.

For example, as shown in FIG. 1, the acoustic processing apparatus 1 stores beforehand a video content D1 of a movie, an acoustic content D2 of the movie, and acoustic information D3 of a movie theater, and in addition, a VR entire spherical video D4 inside the movie theater (step S01). The acoustic information D3 of the movie theater includes various parameters related to acoustic characteristics in the movie theater.

Then, for example, when the acoustic processing apparatus 1 acquires a provision request for a movie content from a user terminal 11 such as a smartphone carried by a user U, the acoustic processing apparatus 1 transmits and provides the user terminal 11 of the user U with the video content D1 of the movie and the acoustic content D2 of the movie.

In this situation, the acoustic processing apparatus 1 converts the acoustic characteristics of the acoustic content D2 of the movie into the acoustic characteristics of the movie theater on the basis of the acoustic information D3 of the movie theater, and provides the user terminal 11 with the acoustic characteristics together with the VR entire spherical video D4 inside the movie theater (step S02).

The VR entire spherical video D4 inside the movie theater includes an image of a screen installed in the movie theater and images of surrounding environments including audience seats, walls, a ceiling, and the like of the movie theater. The acoustic processing apparatus 1 adds information indicating that the position of the screen in the VR entire spherical video D4 inside the movie theater is set to a display position of the video content D1 of the movie to the video content D1 of the movie, and provides the user terminal 11 with the video content D1 of the movie.

Accordingly, the acoustic processing apparatus 1 is capable of displaying the VR entire spherical video D4 inside the movie theater on, for example, a head-mounted display 12 worn by the user U, and displaying the video content D1 of the movie on the screen in the VR entire spherical video D4 (step S03).

At the same time, the acoustic processing apparatus 1 is capable of regenerating the sound field of the acoustic content D2 of the video content D1, in which the acoustic characteristics have been converted into the acoustic characteristics in the movie theater through, for example, an earphone 13 worn by the user U (step S04).

In this manner, the acoustic processing apparatus 1 is capable of allowing the user U to listen to the acoustic content D2, while allowing the user U to visually recognize not only the video content D1 of the movie projected on the screen but also the surrounding environments of the screen such as the audience seats, the walls, the ceiling, and the like of the movie theater.

Accordingly, the acoustic processing apparatus 1 is capable of giving a realistic feeling to the user U who views and listens to the movie video content at home, for example, as if the user U were watching a movie in the movie theater. Here, the VR entire spherical video D4 inside the movie theater is displayed on the head-mounted display 12. However, the acoustic processing apparatus 1 may display a three-dimensional computer graphics (3DCG) video in which the inside of the movie theater is reproduced, instead of the VR entire spherical video D4 inside the movie theater. It is to be noted that the operation of the acoustic processing apparatus 1, which has been described with reference to FIG. 1, is an example. Other operation examples of the acoustic processing apparatus 1 will be described later with reference to FIGS. 7 to 10.

(2. Configuration of Acoustic Processing Apparatus)

Figure 2:
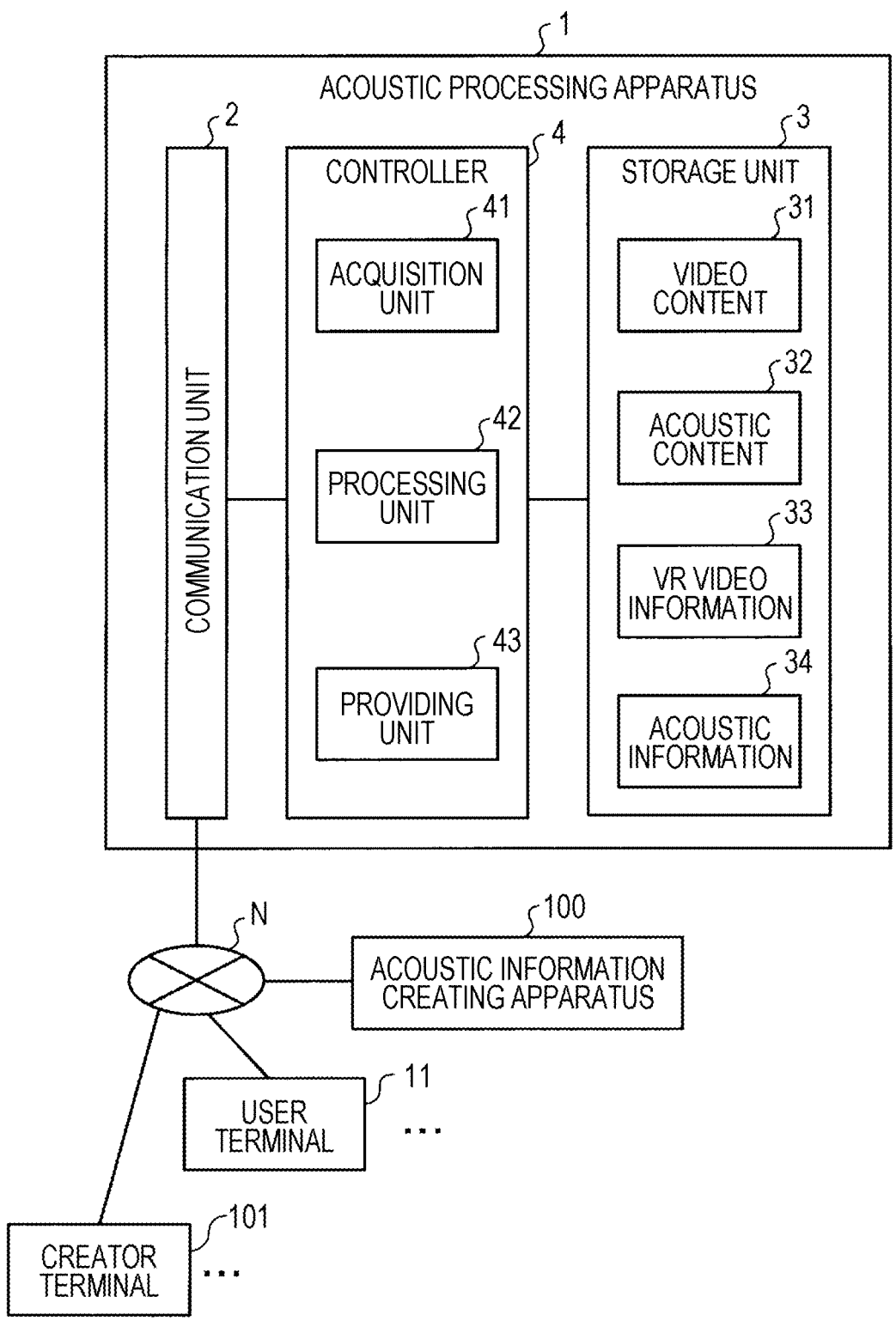
FIG. 2 is a block diagram showing an example of a configuration of the acoustic processing apparatus according to the present disclosure.

Next, an example of the configuration of the acoustic processing apparatus 1 will be described with reference to FIG. 2. FIG. 2 is a block diagram showing an example of the configuration of the acoustic processing apparatus 1 according to the present disclosure. As shown in FIG. 2, the acoustic processing apparatus 1 includes a communication unit 2, a storage unit 3, and a controller 4.

The communication unit 2 is realized by, for example, a network interface card (NIC) or the like. The communication unit 2 is connected to enable information communication with the user terminal 11, an acoustic information creating apparatus 100, and a creator terminal 101 in a wired or wireless manner through a communication network N such as the Internet.

The acoustic information creating apparatus 100 is an apparatus that creates acoustic information 34, which will be described later. Further, the creator terminal 101 is a terminal device used by a creator who creates an acoustic content 32 to be provided for the user U by the acoustic processing apparatus 1.

The storage unit 3 is realized by, for example, a semiconductor memory element such as a random access memory (RAM) or a flash memory (Flash Memory), or a storage device such as a hard disk, an optical disk, or the like. Such a storage unit 3 stores a video content 31, the acoustic content 32, VR video information 33, the acoustic information 34, and the like.

The video content 31 denotes a plurality of video data such as a movie, a live music performance, a promotional video of a music piece, a TV program, and the like, and denotes content data provided for the user terminal 11 by the acoustic processing apparatus 1.

The acoustic content 32 denotes a plurality of pieces of audio data such as a movie, a live music performance, a promotional video of a music piece, a TV program, a music piece, and the like, and denotes content data to be provided for the user terminal 11 by the acoustic processing apparatus 1.

Figure 3:
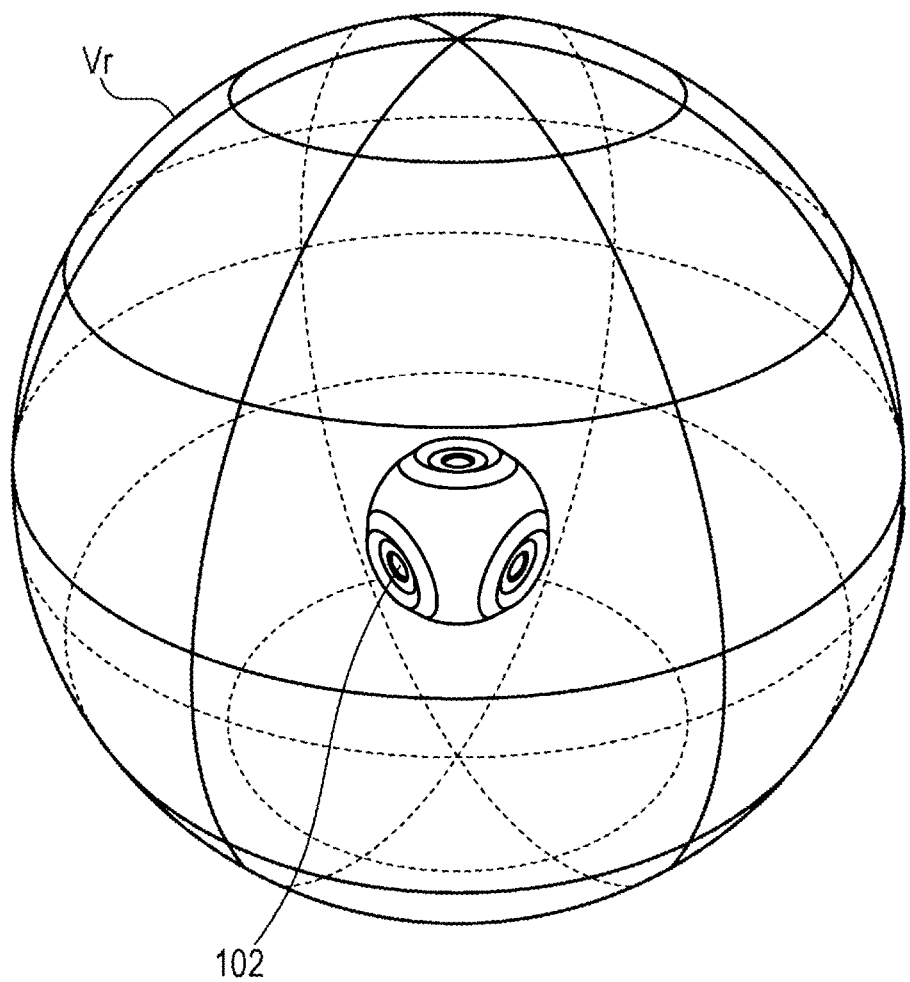
FIG. 3 is an explanatory diagram of a method for creating a VR entire spherical video according to the present disclosure.

The VR video information 33 includes a plurality of VR entire spherical videos that has been captured at various locations. Here, an example of a method for creating a VR entire spherical video will be described with reference to FIG. 3. FIG. 3 is an explanatory diagram of the method for creating the VR entire spherical video according to the present disclosure.

As shown in FIG. 3, in a case where the VR entire spherical video is created, a 360-degree camera 102 is installed at each location where the acoustic content 32 is regenerated, and the 360-degree camera 102 captures an omnidirectional image including the front, back, up, down, left, and, right of such a location, so as to capture a VR entire spherical video Vr.

Accordingly, for example, the 360-degree camera 102 is installed in a movie theater to capture images, so as to enable creation of the VR entire spherical video Vr including the screen of the movie theater shown in FIG. 1 and the images of the surrounding environments of the screen such as the audience seats, the walls, the ceiling, and the like of the movie theater.

It is to be noted that in the example shown in FIG. 1, the movie theater in which a single screen is installed has been given as an example. However, in the present disclosure, a VR entire spherical video Vr of a movie theater including four screens installed on a front face, left and right faces, and a bottom face can be created.

In such a case, the acoustic processing apparatus 1 displays the video content 31 on a single screen of the front face of the four screens, and displays the surrounding environments of the movie theater on the other three screens. Also in such a configuration, the acoustic processing apparatus 1 enables an enhancement in the realistic feeling given to the user.

Returning to FIG. 2, the acoustic information 34 will be described. The acoustic information 34 includes a plurality of pieces of information regarding acoustics at each location, in which the sound field of the acoustic content 32 is regenerated. Here, an example of the acoustic information 34 will be described with reference to FIG. 4. FIG. 4 is an explanatory diagram showing an example of the acoustic information 34 according to the present disclosure.

As shown in FIG. 4, the acoustic information 34 is provided for every user for whom the video content 31 or the acoustic content 32 is provided by the acoustic processing apparatus 1. The acoustic information 34 denotes information in which a user ID, a user's head related transfer function (hereinafter, referred to as an HRTF: Head Related Transfer Function), a location, a VR video, and acoustic parameters are associated with each other.

The user ID is identification information for identifying each user. The HRTF is a function information unique to each user that mathematically represents how the sound reaches user's ears from a sound source. Here, an HRTF measurement method will be described with reference to FIGS. 5 and 6.

Figure 5:
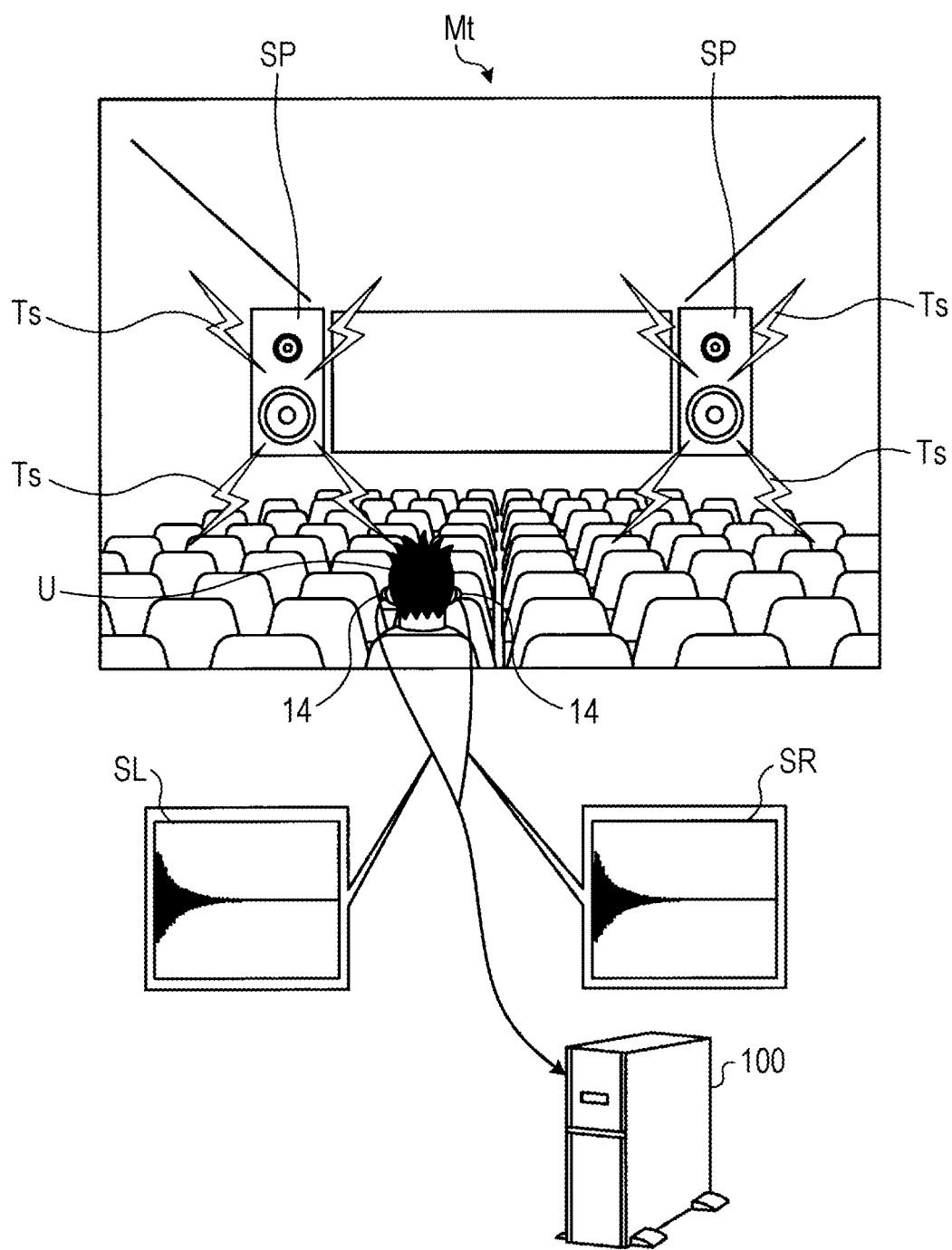
FIG. 5 is an explanatory diagram of an HRTF measurement method according to the present disclosure.
Figure 6:
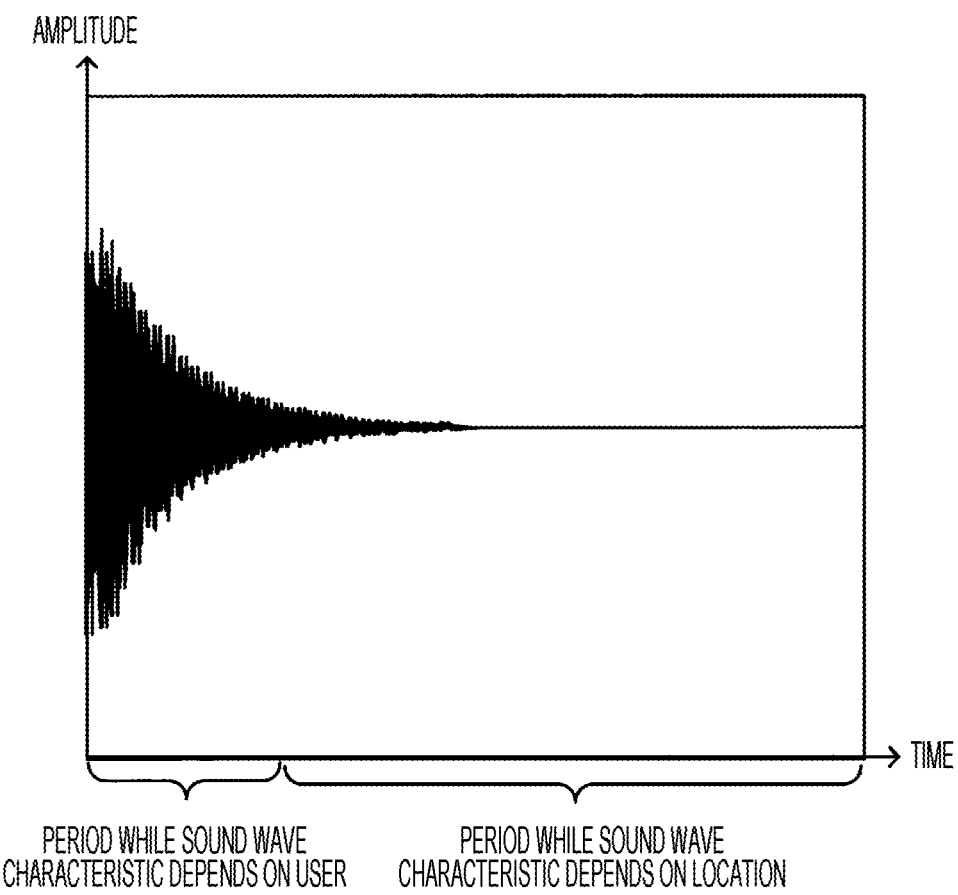
FIG. 6 is an explanatory diagram of the HRTF measurement method according to the present disclosure.
Figure 6:
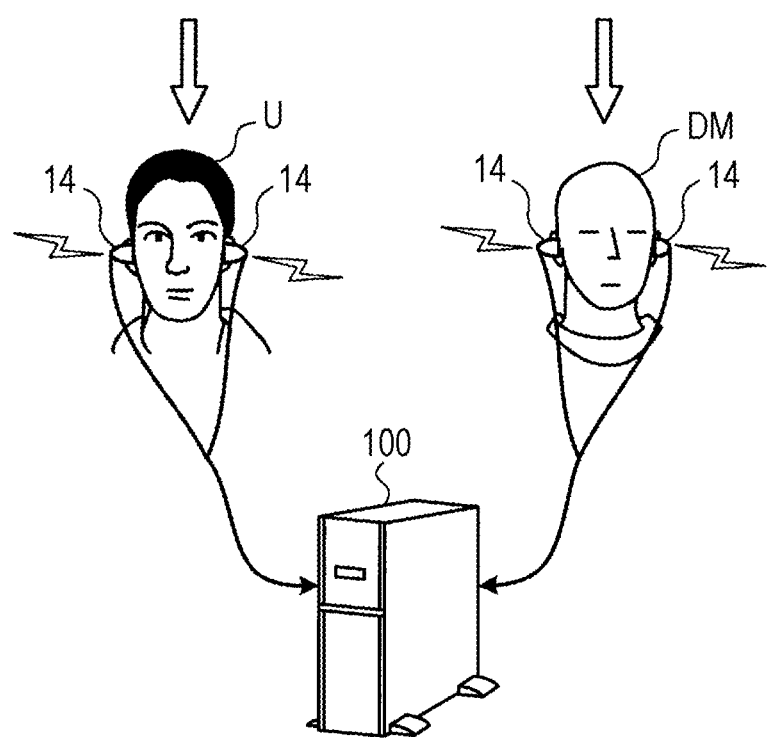

FIGS. 5 and 6 are explanatory views of the HRTF measurement method according to the present disclosure. For example, in a case of measuring the HRTF included in the acoustic information D3 of the movie theater that has been described with reference to FIG. 1, the user U is asked to wear an ear microphone 14 on an audience seat of a movie theater Mt, and the sound of a test signal Ts is output from a speaker SP of the movie theater, as shown in FIG. 5.

Then, the acoustic information creating apparatus 100 acquires an audio signal SL, which has been collected by the ear microphone 14 attached to the left ear of the user U, and an audio signal SR, which has been collected by the ear microphone 14 attached to the right ear of the user U.

Then, the acoustic information creating apparatus 100 derives an HRTF of the user U on the basis of a temporal deviation, a deviation in a signal level (intensity), a difference in resonance, and the like between the two audio signals SL and SR that have been acquired. In this manner, the acoustic information creating apparatus 100 actually measures the test signal Ts heard by the user U, so as to be capable of deriving an accurate HRTF of the user U.

It is to be noted that the HRTF differs depending on the location (the environment) where the user U listens to the test signal Ts. For this reason, for example, in a case where there are a plurality of locations where a user desires to view the video while listening to the acoustic content 32, it is necessary for the user to come to each of the locations in order to measure and derive the HRTF. Such conducts will be a burden for the user.

Therefore, the acoustic information creating apparatus 100 is also capable of deriving the HRTF of the user U at a plurality of locations while reducing the burden of the user U. For example, as shown in FIG. 6, in the audio signal collected by the ear microphone 14 attached to the ear of the user U, a sound wave characteristic has a period depending on the user U in a predetermined period part in the beginning, and after the period, the sound wave characteristic has a period depending on the location.

Therefore, for example, the user U is asked to come to one location and the sound of the test signal Ts is collected by the ear microphone 14, so that the acoustic information creating apparatus 100 acquires an audio signal waveform of a part of the period depending on the user U. Subsequently, dummy dolls DM each equipped with the ear microphone 14 are installed at a plurality of locations desired by the user U, so that the acoustic information creating apparatus 100 acquires the audio signal waveform of a part of the period while the sound wave characteristic depends on the location.

Then, the acoustic information creating apparatus 100 synthesizes the audio signal waveform of the part of the period depending on the user U and the audio signal waveform of the part of the period depending on the location that has been acquired by using the dummy dolls respectively installed at the plurality of locations, and derives the HRTF of the user U at each of the locations on a bases of a synthesized signal.

Accordingly, the acoustic information creating apparatus 100 is capable of deriving the HRTF of the user U at a plurality of locations desired by the user U while reducing the burden on the user U, although the accuracy is slightly lower than that in the case of the actual measurements.

Further, the acoustic information creating apparatus 100, for example, asks the user U to take a photo of the user's ear and transmit image data, so as to be capable of estimating and deriving the HRTF of the user U on the basis of the image data of the ear. In such a case, when the image data including the image of the ear is input, the acoustic information creating apparatus 100 utilizes a learning model that is machine-learned to output the HRTF corresponding to the ear to derive the HRTF of the user U.

Accordingly, the acoustic information creating apparatus 100 is capable of estimating and deriving the HRTF of the user U without asking the user U to come to the location to measure the HRTF. Therefore, a further reduction in the burden on the user U for the HRTF measurement is enabled.

Returning to FIG. 3, the acoustic information 34 will be described continuously. The location included in the acoustic information 34 is identification information for identifying the location that the user U that has been registered beforehand desires to view while listening to the acoustic content 32. The VR video is identification information for identifying the VR entire spherical video corresponding to the location included in the acoustic information 34.

The acoustic parameters are respectively associated with numerical values indicating a reverberation characteristic of a reverberation period or the like and an echo characteristic of a reflection coefficient or the like of an audio wave for every one of a plurality of audio output positions at each location. The acoustic information creating apparatus 100 measures the actual acoustics at each location, and derives the acoustic parameters on the basis of the acoustics that have been collected. Accordingly, the acoustic information creating apparatus 100 is capable of deriving accurate acoustic parameters corresponding to the actual location. It is to be noted that in FIG. 4, data of each item is conceptually represented as "A01" or "B01". However, in reality, specific data corresponding to each item is stored in the data of each item.

The acoustic information creating apparatus 100 transmits the acoustic information 34, which has been created, to the acoustic processing apparatus 1. The acoustic processing apparatus 1 stores the acoustic information 34, which has been received from the acoustic information creating apparatus 100, in the storage unit 3. It is to be noted that here, the description has been given with regard to the case where the acoustic information creating apparatus 100 creates the acoustic information 34. However, the acoustic processing apparatus 1 may include a similar function and configuration as the acoustic information creating apparatus 100, so that the acoustic processing apparatus 1 may create the acoustic information 34 to be stored in the storage unit 3.

Returning to FIG. 2, the controller 4 will be described. The controller 4 includes, for example, a microcomputer including a central processing unit (CPU), a read only memory (ROM), a random access memory (RAM), an input and output port, and various circuits.

The controller 4 includes an acquisition unit 41, a processing unit 42, and a providing unit 43, which function by the CPU performing various programs (corresponding to an example of an acoustic processing program according to an embodiment) stored in the ROM, by using the RAM as a work area.

It is to be noted that the acquisition unit 41, the processing unit 42, and the providing unit 43 included in the controller 4 may partially or wholly include hardware such as an application specific integrated circuit (ASIC) or a field programmable gate array (FPGA).

The acquisition unit 41, the processing unit 42, and the providing unit 43 each achieve or perform actions of an information process to be described below. It is to be noted that an internal configuration of the controller 4 is not limited to the configuration shown in FIG. 2, and may have another configuration as long as the configuration performs the information process to be described later.

The acquisition unit 41 acquires, for example, a provision request for the video content 31 and the acoustic content 32 from the user U. Further, in a case of acquiring the provision request for the video content 31 and the acoustic content 32 from the user U, the acquisition unit 41 acquires information regarding the location to be viewed by a user who listens to the acoustic content 32 from the user terminal 11.

For example, in a case of acquiring the provision request for the video content D1 of the movie and the acoustic content D2 of the movie from the user terminal 11 and acquiring the information indicating a movie theater as the location information from the user terminal 11, the acquisition unit 41 outputs the information that has been acquired from the user terminal 11 to the processing unit 42.

In a case where the information that has been acquired from the user terminal 11 is input from the acquisition unit 41, the processing unit 42 converts the acoustic characteristics of the acoustic content 32 into acoustic characteristic in accordance with the location corresponding to the location information that has been acquired from the user terminal 11 on the basis of the acoustic information 34, and outputs the acoustic characteristics that have been subject to conversion to the providing unit 43.

In this situation, the processing unit 42 applies the HRTF of the user U for every user U to convert the acoustic characteristics for the acoustic content 32. Accordingly, the processing unit 42 is capable of converting the acoustic characteristics of the acoustic content 32 so as to make optimum acoustic characteristics for the user U. The processing unit 42 outputs the information that has been acquired from the user terminal 11 to the providing unit 43 together with the acoustic content 32 that has been subject to the acoustic characteristic conversion.

The providing unit 43 transmits to the user terminal 11, the acoustic content 32 input from the processing unit 42, the VR entire spherical video of the location corresponding to the location information, and the video content 31 for which the provision request has been made by the user.

Accordingly, for example, as shown in FIG. 1, the acoustic processing apparatus 1 is capable of allowing the user U to visually recognize not only the video content D1 of the movie projected on the screen but also the surrounding environments of the screen such as the audience seats, the walls, the ceiling, and the like of the movie theater.

Then, at the same time, the acoustic processing apparatus 1 is capable of allowing the user to listen to the acoustic content D2 of the movie, in which the acoustic characteristics have been converted into the acoustic characteristics of the movie theater. Therefore, the acoustic processing apparatus 1 is capable of giving a realistic feeling to the user U who views and listens to the movie video content at home, for example, as if the user U were watching a movie in the movie theater.

It is to be noted that heretofore, the case where the acquisition unit 41 acquires the provision request for the video content 31 and the acoustic content 32 from the user terminal 11 has been described. However, the acquisition unit 41 acquires an image of a staying location of the user U together with the provision request for the acoustic content 32 from the user terminal 11, in some cases.

In such cases, the processing unit 42 converts the acoustic characteristics of the acoustic content 32 in accordance with the staying location of the user U, the providing unit 43 transmits the acoustic content 32 that has been subject to conversion to the user terminal 11, and the user terminal 11 regenerates the sound field of the acoustic content 32. Such operation examples of the acoustic processing apparatus 1 will be described later with reference to FIGS. 7 and 8.

In addition, the acquisition unit 41 acquires the provision request for the acoustic information 34 of the acoustic content 32 and the VR entire spherical video of the location in which the sound field of the acoustic content 32 is regenerated, from a creator who has created the acoustic content 32, in some cases. An operation example of the acoustic processing apparatus 1 in such cases will be described later with reference to FIG. 10.

(3. Operation Examples of Acoustic Processing Apparatus)

Next, an operation example of the acoustic processing apparatus 1 will be described with reference to FIGS. 7 to 10. FIGS. 7 to 10 are explanatory diagrams of operation examples of the acoustic processing apparatus 1 according to the present disclosure.

Figure 7:
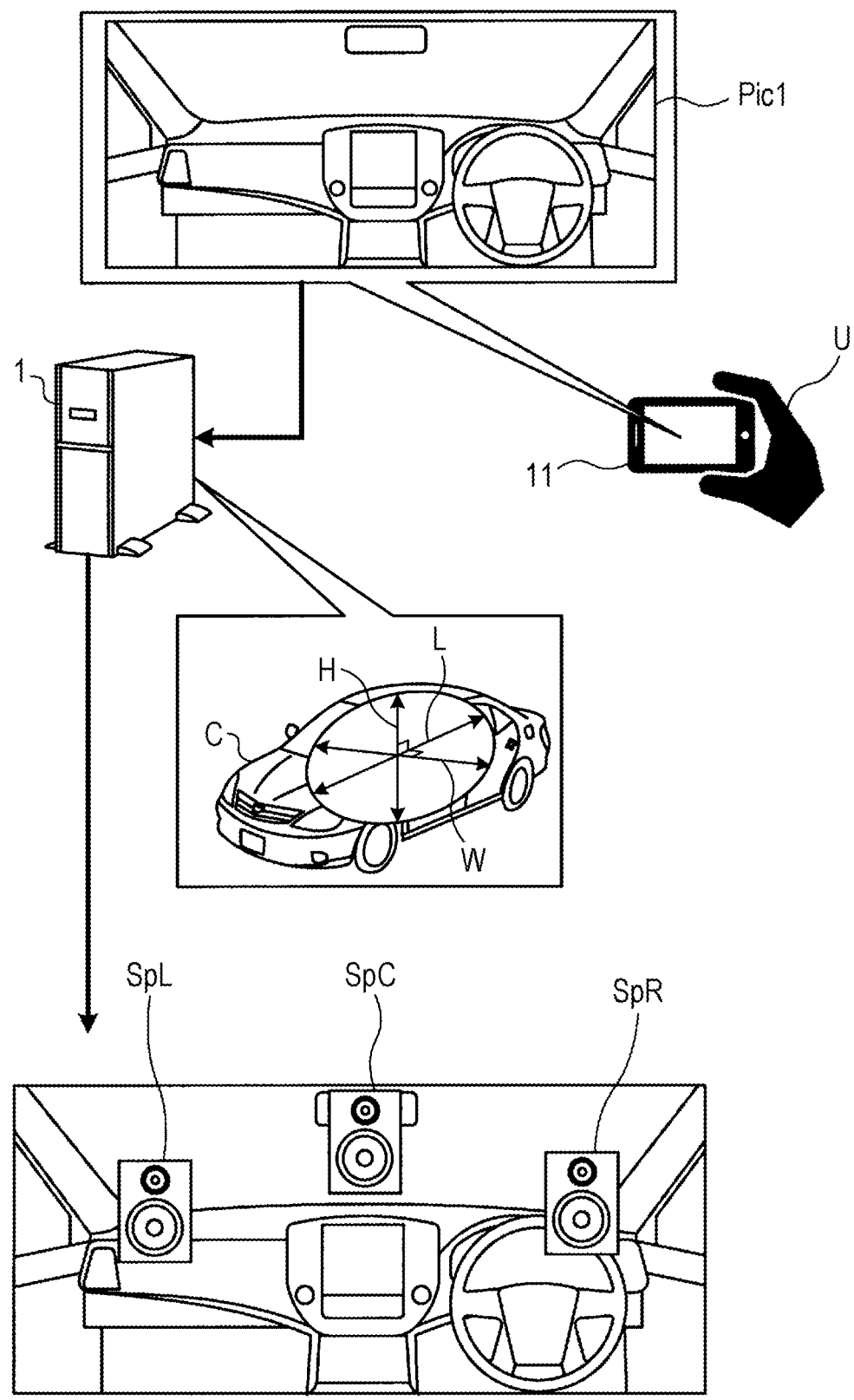
FIG. 7 is an explanatory diagram of an operation example of the acoustic processing apparatus according to the present disclosure.

As shown in FIG. 7, the acquisition unit 41 of the acoustic processing apparatus 1 acquires, for example, an image Pic1 in which the staying location of user U (here, the inside of a vehicle C) has been captured by the user terminal 11 when the user U stays inside the vehicle C, and the provision request for the acoustic content 32, in some cases.

In such cases, the acoustic processing apparatus 1 predicts the acoustic characteristics of the staying location from the image Pic1 of the staying location, converts the acoustic characteristics of the acoustic content 32 into the acoustic characteristics that have been predicted, and causes the user terminal 11 to regenerate the sound field. For example, the processing unit 42 of the acoustic processing apparatus 1 conducts image recognition of the image Pic1, and determines that the staying location of the user U is a space inside the vehicle C.

Then, the processing unit 42 estimates a length L in a front-rear direction, a length W in a lateral direction, and a length H in a height direction in the vehicle from the image Pic1 to predict the size of the space inside the vehicle, and predicts acoustic characteristics such as an echo characteristic, a reverberation characteristic, and the like of the space inside the vehicle on the basis of the size of the space inside the vehicle.

Subsequently, the processing unit 42 converts the acoustic characteristics of the acoustic content 32 into the acoustic characteristics that have been predicted, and for example, arranges a virtual speaker SpC at a center position on the front side and virtual speakers SpL and SpR at positions respectively apart from the center by 30 degrees to the left and right in the vehicle.

Then, the processing unit 42 converts the acoustic characteristics of the acoustic content 32 so that the sounds can be heard as if they were outputting from the three virtual speakers SpC, SpL, and SpR, and outputs the acoustic characteristics that have been subject to conversion to the providing unit 43. The processing unit 42 causes the providing unit 43 to transmit the acoustic content 32 to the user terminal 11.

Accordingly, the acoustic processing apparatus 1 is capable of giving a realistic feeling to the user U, for example, as if the user U were listening to the acoustic content 32 with a high-quality car audio, when the user U listens to the acoustic content 32 with an earphone.

Figure 8:
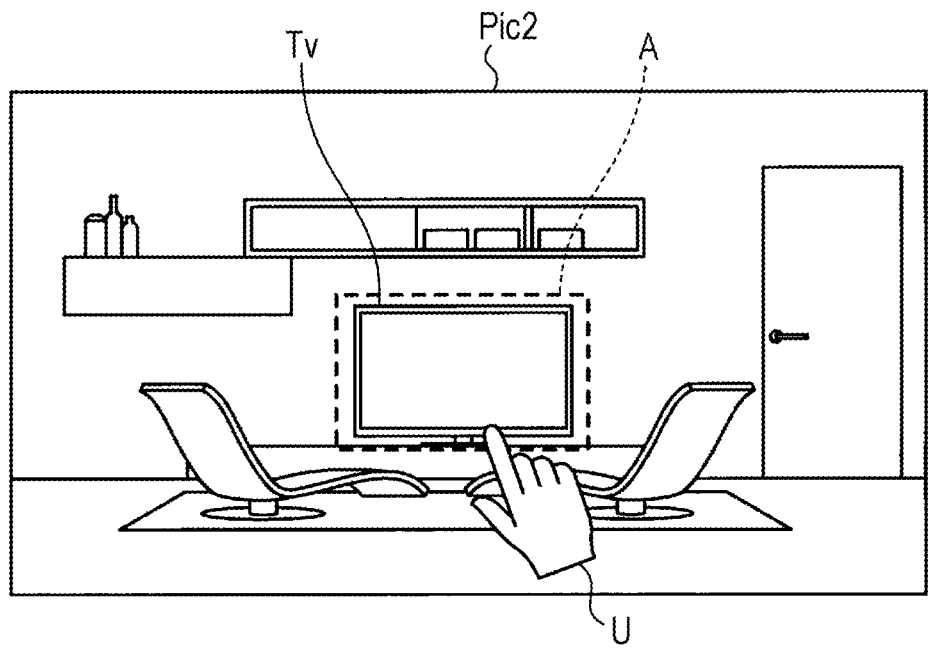
FIG. 8 is an explanatory diagram of an operation example of the acoustic processing apparatus according to the present disclosure.
Figure 8:
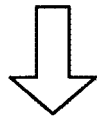
Figure 8:
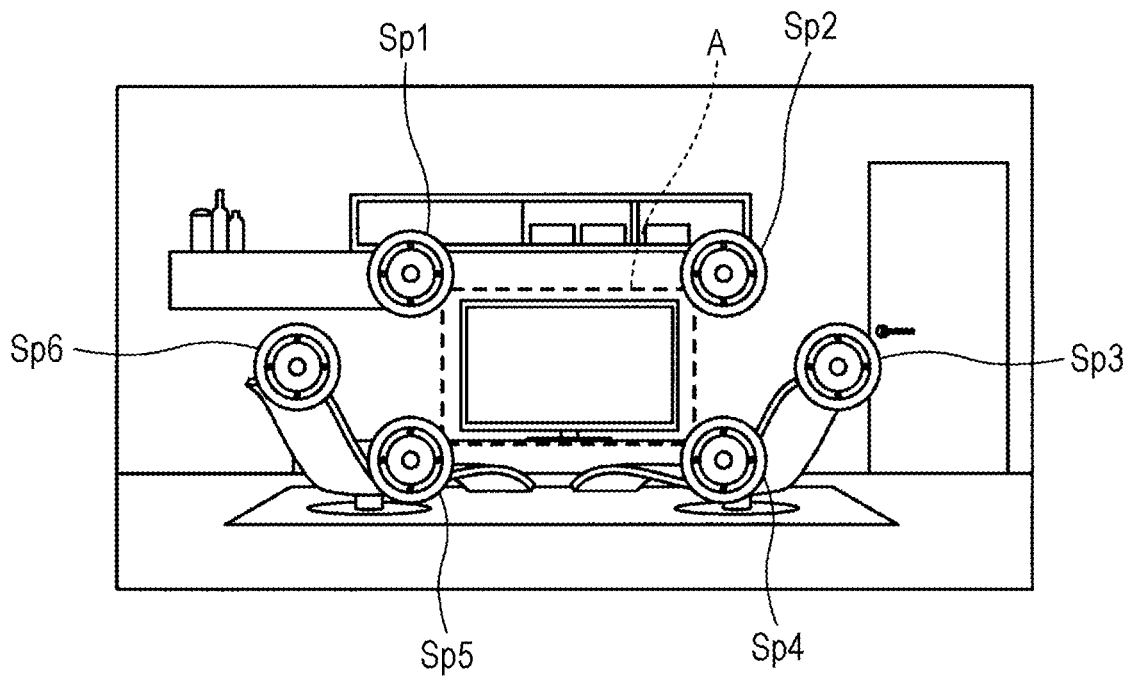

Further, as shown in FIG. 8, the acquisition unit 41 acquires an image Pic2 in which the staying location has been captured by the user U when the user U stays in a living room at home, and a provision request for the video content 31 and the acoustic content 32, in some cases.

Further, in this situation, the acquisition unit 41 acquires information indicating that, for example, the user U has selected a predetermined area A (here, an area surrounding a television Tv) including a visual field center of the user U from the image Pic2, in some cases.

In such cases, the processing unit 42 arranges virtual speakers Sp1, Sp2, Sp3, Sp4, Sp5, and Sp6, which correspond to the audio output positions of the acoustic content 32, so as to surround the predetermined area A. Then, the processing unit 42 converts the acoustic characteristics of the acoustic content 32, and outputs the acoustic characteristics that have been subject to conversion to the providing unit 43 so that the sounds can be heard as if they were outputting from the virtual speakers Sp1, Sp2, Sp3, Sp4, Sp5, and Sp6.

The providing unit 43 transmits to the user terminal 11, the video content 31, for which the provision request has been made by the user U, and the acoustic content 32, the acoustic characteristics of which have been subject to conversion by the processing unit 42, and causes the user terminal 11 to display the video content 31 and to regenerate the sound field of the acoustic content 32.

Accordingly, in a case where the user U listens to the acoustic content 32 with the earphone, the acoustic processing apparatus 1 is capable of giving the user U a realistic feeling as if the user U were listening to the acoustic content 32 with a high-quality audio device, while displaying the video content 31 on the television Tv.

Figure 9:
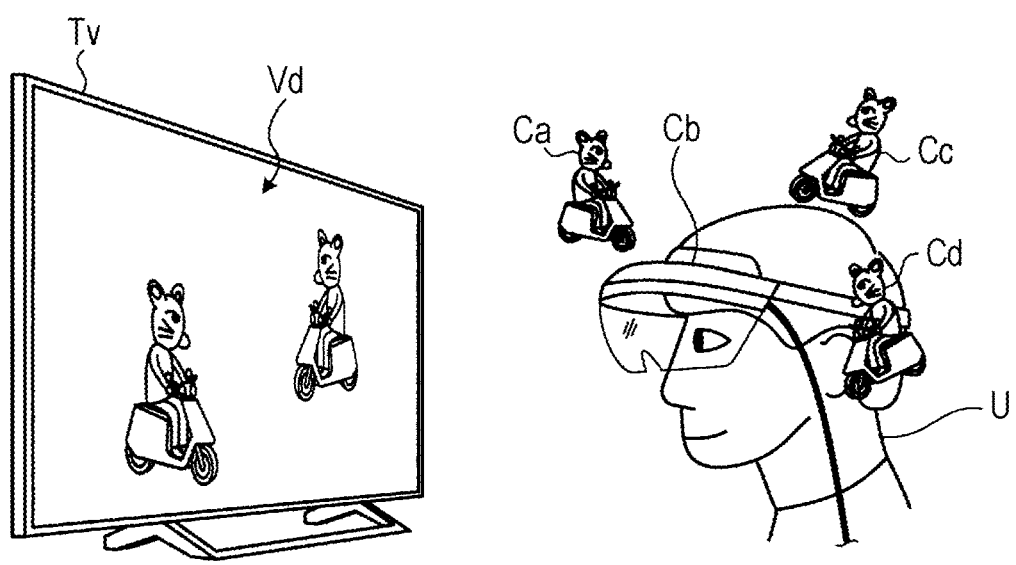
FIG. 9 is an explanatory diagram of an operation example of the acoustic processing apparatus according to the present disclosure.

In addition, in this situation, for example, as shown in FIG. 9, the user U is viewing and listening to an animation product Vd on the television Tv, in some cases. In such cases, the acoustic processing apparatus 1 is also capable of displaying augmented reality (AR: Augmented Reality) images Ca, Cc, and Cd of characters appearing in the product Vd around the user on a head-mounted display Cb. Accordingly, the acoustic processing apparatus 1 is capable of further enhancing the realistic feeling given to the user U.

It is to be noted that here, the staying location of the user is predicted from the image that has been captured by the user U. However, this is an example. The acquisition unit 41 is also capable of acquiring, for example, position information of the user U, the position of which is measured by the global positioning system (GPS) included in the user terminal 11.

In such a case, the processing unit 42 predicts the staying location of the user from the position information of the user that has been acquired by the acquisition unit, converts the acoustic characteristics of the acoustic content 32 into the acoustic characteristics of the staying location that has been predicted, and regenerates the sound field. Accordingly, the processing unit 42 is capable of converting the acoustic characteristics of the acoustic content 32 into the acoustic characteristics in accordance with an accurate staying location that has been measured by the GPS.

In addition, the acquisition unit 41 is also capable of acquiring an image that has been selected from the images that had been captured by the user U in the past from the user terminal 11 or an image that has been viewed by the user U via the communication network N.

In such a case, the processing unit 42 predicts the acoustic characteristics of a location appearing in the image that has been acquired by the acquisition unit 41, converts the acoustic characteristics of the acoustic content into the acoustic characteristics that have been predicted, and regenerates the sound field. Accordingly, the acoustic processing apparatus 1 gives the user U a realistic feeling, for example, as if the user U were listening to the acoustic content 32 at a location of memories that the user U has visited in the past or a favorite location appearing in the image that the user U has viewed in the past.

Further, the processing unit 42 changes the number of the virtual speakers to be arranged as the audio output positions of the acoustic content 32 and the audio output characteristics of the virtual speakers in accordance with the size of the space that is predicted from the image that the user U is staying. For example, the processing unit 42 increases the number of the virtual speakers to be arranged, as the size of the space to be predicted becomes larger.

Further, in a case where the size of the space to be predicted becomes further larger, the processing unit 42 arranges, for example, a virtual speaker having audio output characteristics such that the acoustic content 32 can be heard from a 360-degree direction like a surround speaker. Accordingly, the acoustic processing apparatus 1 is capable of causing the user terminal 11 to regenerate an optimum sound field in accordance with the size of the staying location of the user U.

Further, the acquisition unit 41 acquires, for example, a provision request for the acoustic information 34 of the acoustic content 32 and the VR entire spherical video of the location in which the sound field of the acoustic content 32 is regenerated, from the creator who has created the acoustic content 32, in some cases.

Figure 10:
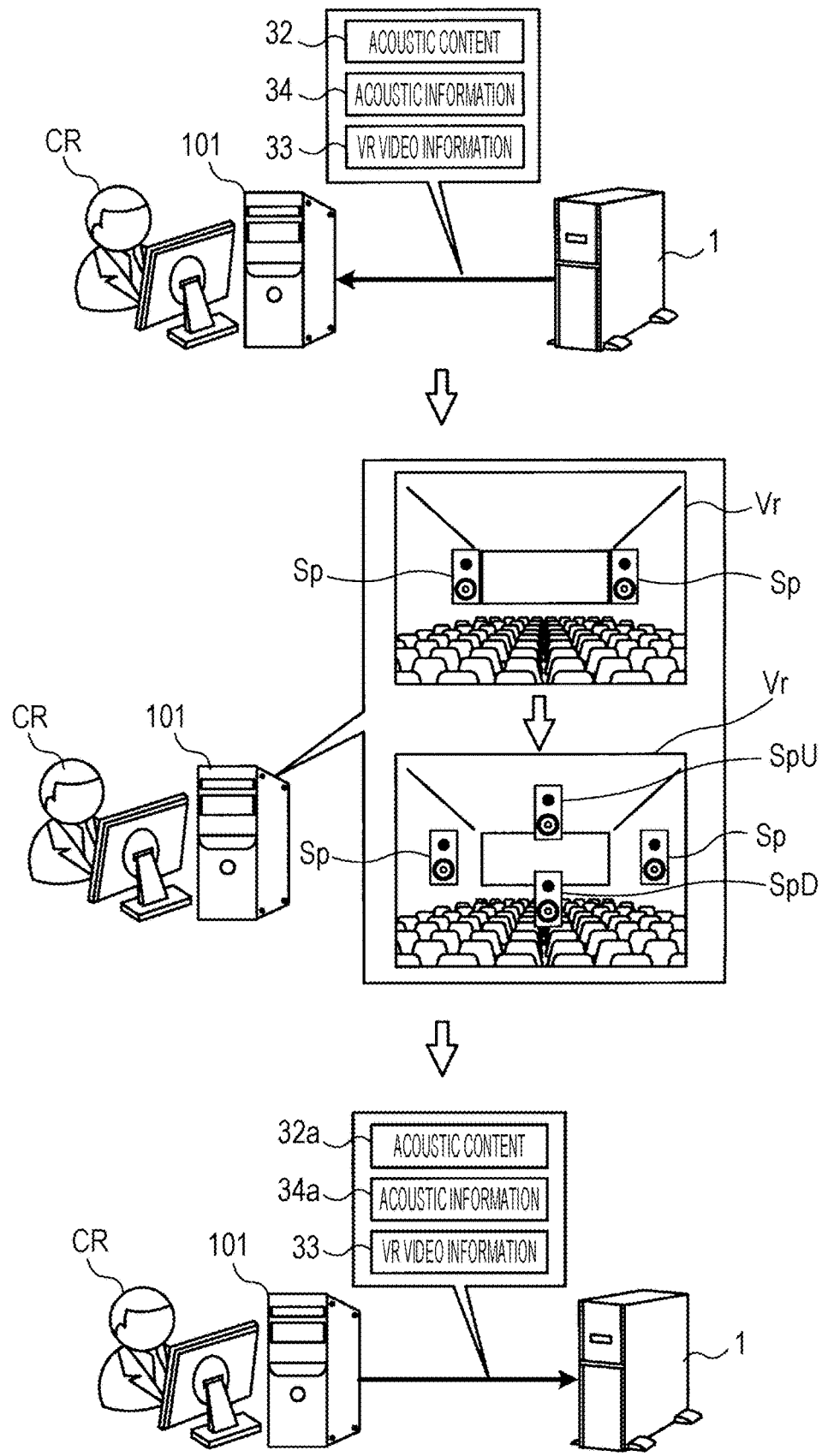
FIG. 10 is an explanatory diagram of an operation example of the acoustic processing apparatus according to the present disclosure.

In such cases, as shown in FIG. 10, the processing unit 42 of the acoustic processing apparatus 1 causes the providing unit 43 to transmit the acoustic content 32, the acoustic information 34, and the VR video information 33, for which the provision request has been made for the creator terminal 101, to the creator terminal 101 used by a creator CR.

Accordingly, the creator CR is able to change, for example, the acoustic information 34 on the basis of the creator's own creative intention, while viewing the VR entire spherical video Vr of the movie theater included in the VR video information 33. For example, in the present state, the creator CR is able to change the acoustic information 34, which can be heard as if virtual speakers Sp were arranged on both sides of the screen of a movie theater, to the acoustic information 34, which can be heard as if the virtual speakers Sp were arranged further away from both sides of the screen.

Further, the creator CR is able to change, for example, to the acoustic information 34, which can be heard as if a new virtual speaker SpU were arranged above the screen and a new virtual speaker SpD were arranged below the screen. In this situation, the creator CR listens to the acoustic content 32 to which the creator's own HRTF has been applied, and changes the acoustic information 34.

Then, the creator CR transmits acoustic information 34a, an acoustic content 32a, and the VR video information 33, which have been changed, from the creator terminal 101 to the acoustic processing apparatus 1. The acoustic processing apparatus 1 causes the storage unit 3 to store the acoustic information 34a, the acoustic content 32a, and the VR video information 33, which have been received from the creator terminal 101.

Accordingly, when providing the acoustic content 32a to the user U next time, the acoustic processing apparatus 1 is capable of regenerating the sound field of the acoustic content 32a with the acoustic characteristics on which the creative intention of the creator CR has been reflected. In this situation, the acoustic processing apparatus 1 provides the user U with the acoustic content 32a to which the HRTF of the user U has been applied, and is capable of regenerating the sound filed of the acoustic content 32a having the optimum acoustic characteristics for the user U.

(4. Process Performed by Acoustic Processing Apparatus)

Figure 11:
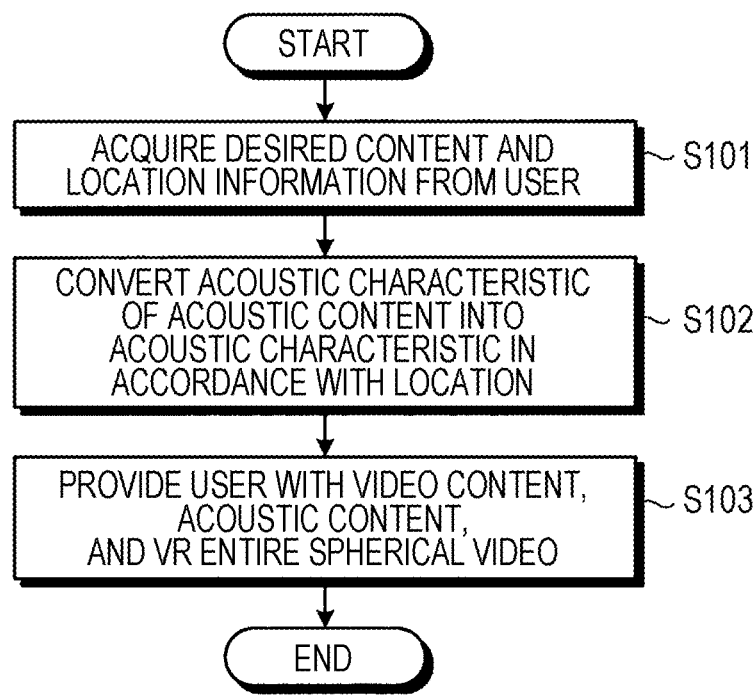
FIG. 11 is a flowchart showing an example of a process performed by a controller of the acoustic processing apparatus according to the present disclosure.
Figure 12:
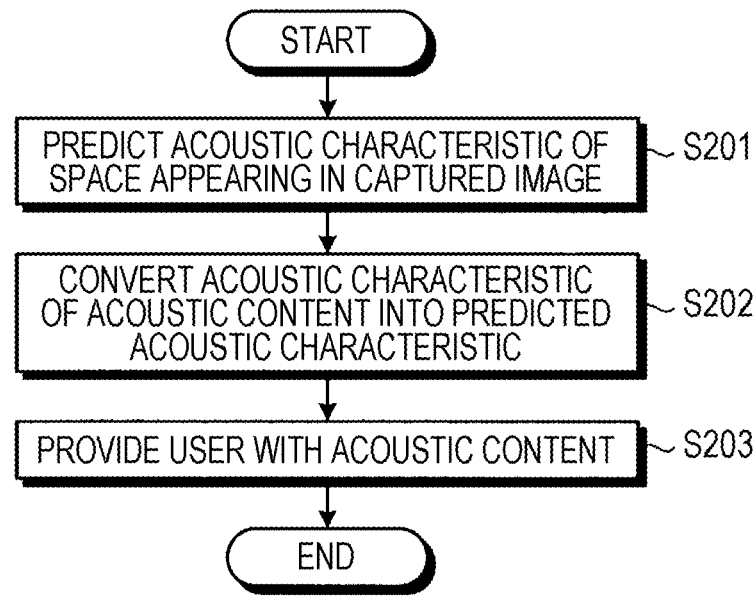
FIG. 12 is a flowchart showing an example of the process performed by the controller of the acoustic processing apparatus according to the present disclosure.
Figure 13:
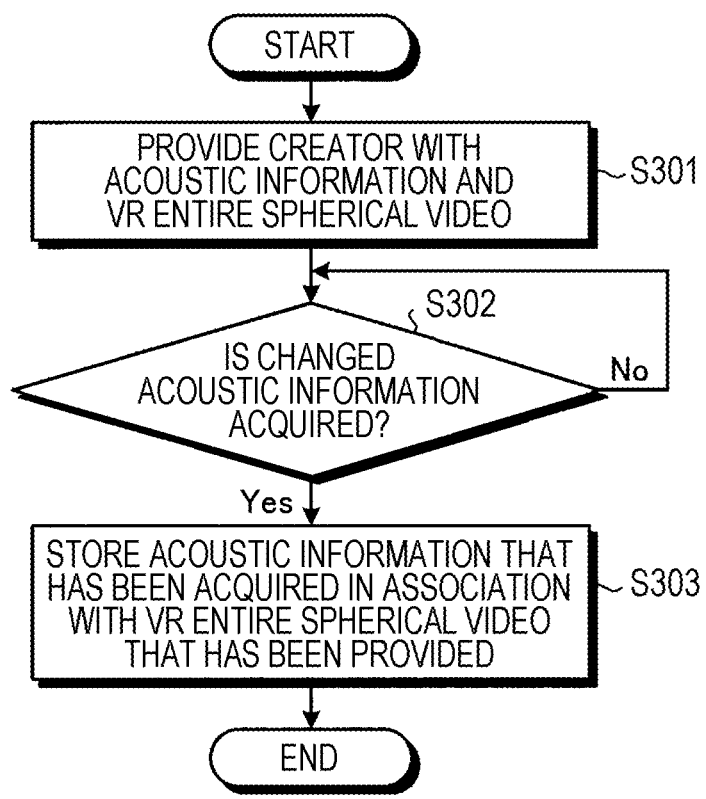
FIG. 13 is a flowchart showing an example of the process performed by the controller of the acoustic processing apparatus according to the present disclosure.

Next, an example of a process performed by the controller 4 of the acoustic processing apparatus 1 will be described with reference to FIGS. 11 to 13. FIGS. 11 to 13 are flowcharts showing an example of the process performed by the controller 4 of the acoustic processing apparatus 1 according to the present disclosure.

When the controller 4 of the acoustic processing apparatus 1 acquires a provision request for a content including acoustics and a video from the user U of the user terminal 11, the controller 4 performs the process shown in FIG. 11. Specifically, when the controller 4 acquires the provision request for the content from the user U, the controller 4 first acquires the content desired by the user U and location information from the user U (step S101).

Subsequently, the controller 4 converts the acoustic characteristics of the acoustic content corresponding to the content desired by the user into the acoustic characteristics in accordance with the acoustic characteristics corresponding to the location information (step S102). Then, the controller 4 provides the user U with the video content, the acoustic content in which the acoustic characteristics have been subject to conversion, and the VR entire spherical video to be visually recognized by the user U when the acoustic content and the video content are regenerated, so as to regenerate the sound field (step S103), and ends the process.

Further, the controller 4 performs the process shown in FIG. 12, when acquiring the provision request for the acoustic content from the user and the image of the staying location of the user that has been captured by the user. Specifically, when the controller 4 acquires the provision request for the content and the captured image from the user U, the controller 4 first predicts the acoustic characteristics of a space appearing in the captured image (step S201).

Subsequently, the controller 4 converts the acoustic characteristics of the acoustic content corresponding to the content desired by the user U into the acoustic characteristics of the space predicted in step S201 (step S202). Then, the controller 4 provides the user U with the acoustic content in which the acoustic characteristics have been subject to conversion, regenerates the sound field (step S203), and ends the process.

Further, in a case where the predetermined area A in the captured image is selected by the user, the controller 4 performs a process of arranging the audio output position of the acoustic content so as to surround the predetermined area A, and provides the user U with the acoustic content.

In this situation, the controller 4 changes the number of audio output positions and audio output characteristics of the acoustic content to be arranged in accordance with the size of the predetermined area A selected by the user, and provides the user U with the acoustic content.

It is to be noted that also when acquiring from the user U the provision request for the content including the acoustics and the video, and the captured image in which the staying location of the user appears, the controller 4 is capable of predicting the acoustic characteristics of the space appearing in the captured image, and providing the user U with the acoustic content in which the acoustic characteristics have been converted into the predicted ones.

Further, the controller 4 performs the process shown in FIG. 13, when acquiring from the creator CR of the acoustic content, for example, the acoustic information of the acoustic content and the provision request for the location, in which the sound field of the acoustic content is regenerated.

Specifically, when acquiring the provision request for the acoustic information and the location from the creator CR, the controller 4 first provides the creator CR with the acoustic information and the VR entire spherical video of the location, in which the sound field of the acoustic content corresponding to the acoustic information is regenerated (step S301).

Subsequently, the controller 4 determines whether or not the changed acoustic information has been acquired from the creator CR (step S302). Then, when the controller 4 determines that the acoustic information has not been acquired from the creator CR (steps S302, No), the controller 4 repeats the determination process of step S302 until the acoustic information is acquired.

Then, when it is determined that the acoustic information has been acquired from the creator CR (step S302, Yes), the controller 4 stores the acoustic characteristics that have been acquired in association with the VR entire spherical video that has been provided for the creator CR (step S303), and ends the process.

It is to be noted that the effects described in the present specification are merely examples and non-limiting ones, and other effects may be obtainable.

It is to be noted that the present technology can also have the following configurations.

(1)

An acoustic processing apparatus including:

an acquisition unit configured to acquire location information regarding a location viewed by a user who listens to an acoustic content;

(1)
a storage unit configured to store acoustic information regarding acoustics at the location; and
a processing unit configured to convert an acoustic characteristic of the acoustic content into an acoustic characteristic in accordance with the location on the basis of the acoustic information, and configured to regenerate a sound field.

(2)
The acoustic processing apparatus described in the above (1),
in which the storage unit
stores a virtual reality entire spherical video of the location, and
the processing unit
causes the user to visually recognize the virtual reality entire spherical video while regenerating the sound field of the acoustic content.

(3)
The acoustic processing apparatus described in the above (2),
in which the storage unit
stores the virtual reality entire spherical video including a screen on which a video content corresponding to the acoustic content is displayed at the location, and an image of a surrounding environment of the screen, and
the processing unit
displays the video content on the screen in the virtual reality entire spherical video.

(4)
The acoustic processing apparatus described in the above (2),
in which the storage unit
stores the virtual reality entire spherical video including four screens on which the video content corresponding to the acoustic content is displayed at the location, and
the processing unit
displays the video content on one of the four screens in the virtual reality entire spherical video, and displays an image of a surrounding environment of the location on the other three screens.

(5)
The acoustic processing apparatus described in the above (1),
in which the acquisition unit
acquires an image of a staying location that has been captured by the user, and
the processing unit
predicts the acoustic characteristic of the staying location from the image of the staying location, converts the acoustic characteristic of the acoustic content into the acoustic characteristic that has been predicted, and regenerates the sound field.

(6)
The acoustic processing apparatus described in the above (5),
in which the processing unit
predicts the acoustic characteristic of a space of the staying location on the basis of a size of the space of the staying location to be predicted from the image of the staying location.

(7)
The acoustic processing apparatus described in the above (6),
in which the processing unit
predicts a reverberation characteristic and an echo characteristic in the space.

(8)
The acoustic processing apparatus described in the above (6),
in which the processing unit
changes the number of audio output positions and an audio output characteristic of the acoustic content to be arranged in accordance with the size of the space of the staying location to be predicted from the image of the staying location.

(9)
The acoustic processing apparatus described in any of the above (5) to (8),
in which in a case where the user selects a predetermined area including a center of a visual field of the user from the image of the staying location, the processing unit
arranges an audio output position of the acoustic content to surround the predetermined area.

(10)
The acoustic processing apparatus described in the above (1),
in which the acquisition unit
acquires an image that has been selected from images that have been captured by the user in a past, or an image that has been viewed by the user via a communication network, and
the processing unit
predicts the acoustic characteristic of a location that appears in the image, converts the acoustic characteristic of the acoustic content into the acoustic characteristic that has been predicted, and regenerates the sound field.

(11)
The acoustic processing apparatus described in the above (1),
in which the acquisition unit
acquires the position information of the user that is measured by a global positioning system (GPS), and
the processing unit
predicts a staying location of the user from the position information of the user, converts the acoustic characteristic of the acoustic content into the acoustic characteristic of the staying location that has been predicted, and regenerates the sound field.

(12)
The acoustic processing apparatus described in the above (2), further including:
a providing unit configured to provide a creator of the acoustic content with the acoustic content, and the virtual reality entire spherical video and the acoustic information of the location in which the sound field of the acoustic content is regenerated,
in which the acquisition unit
acquires the acoustic information that has been changed by the creator, and
the storage unit
stores the acoustic content and the virtual reality entire spherical video of the location at which the sound field of the acoustic content is regenerated, the acoustic content and the virtual reality entire spherical video having been provided for the creator, in association with the acoustic information that has been changed by the creator.

(13)
The acoustic processing apparatus described in any of the above (1) to (12), in which the storage unit
stores the acoustic information that has been generated on the basis of the acoustics that have been measured at the location.

(14)
The acoustic processing apparatus described in any of the above (1) to (13),
in which the storage unit
stores a head related transfer function of the user, and
the processing unit
applies for the every user, the head related transfer function of the user to convert the acoustic characteristic of the acoustic content.

(15)
The acoustic processing apparatus described in the above (14),
in which the storage unit
stores the head-related transfer function that has been derived on the basis of the acoustics that have been sound-recorded by an ear microphone worn by the user.

(16)
The acoustic processing apparatus described in the above (14),
in which the storage unit
stores the head-related transfer function that has been derived on the basis of the acoustics in which a sound is recorded by an ear microphone worn by the user in a period while a sound wave characteristic depends on the user, and the acoustics in which a sound is recorded by an ear microphone worn by a doll in a period while a sound wave characteristic depends on the location.

(17)
The acoustic processing apparatus described in the above (14),
in which the storage unit
stores the head-related transfer function derived on the basis of an image of an ear of the user.

(18)
An acoustic processing method to be performed by a computer, the acoustic processing method including:
an acquisition step of acquiring location information regarding a location viewed by a user who listens to an acoustic content;
a storage step of storing acoustic information regarding acoustics at the location; and
a processing step of converting an acoustic characteristic of the acoustic content into an acoustic characteristic in accordance with the location on the basis of the acoustic information, and regenerating a sound field.

(19)
An acoustic processing program that causes a computer to execute:
an acquisition procedure to acquire location information regarding a location viewed by a user who listens to an acoustic content;
a storage procedure to store acoustic information regarding acoustics at the location; and
a processing procedure to convert an acoustic characteristic of the acoustic content into an acoustic characteristic in accordance with the location on the basis of the acoustic information, and to regenerate a sound field.

REFERENCE SIGNS LIST

1 Acoustic processing apparatus
2 Communication unit
3 Storage unit
31 Video content
32 Acoustic content
33 VR video information
34 Acoustic information
4 Controller
41 Acquisition unit
42 Processing unit
43 Providing unit

The invention claimed is:
1. An acoustic processing apparatus comprising:
an acquisition unit configured to acquire location information regarding a location viewed by a user who listens to an acoustic content;
a storage unit configured to store acoustic information regarding acoustics at the location, wherein the storage unit stores a virtual reality entire spherical video of the location;
a processing unit configured to convert an acoustic characteristic of the acoustic content into an acoustic characteristic in accordance with the location on a basis of the acoustic information, and configured to regenerate a sound field, wherein the processing unit causes the user to visually recognize the virtual reality entire spherical video while regenerating the sound field of the acoustic content; and
a providing unit configured to provide a creator of the acoustic content with the acoustic content, and the virtual reality entire spherical video and the acoustic information of the location in which the sound field of the acoustic content is regenerated,
wherein the acquisition unit acquires the acoustic information that has been changed by the creator, and
the storage unit stores the acoustic content and the virtual reality entire spherical video of the location at which the sound field of the acoustic content is regenerated, the acoustic content and the virtual reality entire spherical video having been provided for the creator, in association with the acoustic information that has been changed by the creator.

2. The acoustic processing apparatus according to claim 1, wherein the storage unit
stores the virtual reality entire spherical video including a screen on which a video content corresponding to the acoustic content is displayed at the location, and an image of a surrounding environment of the screen, and
the processing unit
displays the video content on the screen in the virtual reality entire spherical video.

3. The acoustic processing apparatus according to claim 1, wherein the storage unit
stores the virtual reality entire spherical video including four screens on which the video content corresponding to the acoustic content is displayed at the location, and
the processing unit
displays the video content on one of the four screens in the virtual reality entire spherical video, and displays an image of a surrounding environment of the location on the other three screens.

4. The acoustic processing apparatus according to claim 1, wherein the acquisition unit
acquires an image of a staying location that has been captured by the user, and
the processing unit
predicts the acoustic characteristic of the staying location from the image of the staying location, converts the acoustic characteristic of the acoustic content into the acoustic characteristic that has been predicted, and regenerates the sound field.

5. The acoustic processing apparatus according to claim 4, wherein the processing unit
predicts the acoustic characteristic of a space of the staying location on a basis of a size of the space of the staying location to be predicted from the image of the staying location.

6. The acoustic processing apparatus according to claim 5, wherein the processing unit
predicts a reverberation characteristic and an echo characteristic in the space.

7. The acoustic processing apparatus according to claim 5, wherein the processing unit
changes the number of audio output positions and an audio output characteristic of the acoustic content to be arranged in accordance with the size of the space of the staying location to be predicted from the image of the staying location.

8. The acoustic processing apparatus according to claim 4, wherein in a case where the user selects a predetermined area including a center of a visual field of the user from the image of the staying location, the processing unit arranges an audio output position of the acoustic content to surround the predetermined area.

9. The acoustic processing apparatus according to claim 1, wherein the acquisition unit
acquires an image that has been selected from images that have been captured by the user in a past, or an image that has been viewed by the user via a communication network, and
the processing unit
predicts the acoustic characteristic of a location that appears in the image, converts the acoustic characteristic of the acoustic content into the acoustic characteristic that has been predicted, and regenerates the sound field.

10. The acoustic processing apparatus according to claim 1,
wherein the acquisition unit
acquires the position information of the user that is measured by a global positioning system (GPS), and
the processing unit
predicts a staying location of the user from the position information of the user, converts the acoustic characteristic of the acoustic content into the acoustic characteristic of the staying location that has been predicted, and regenerates the sound field.

11. The acoustic processing apparatus according to claim 1,
wherein the storage unit
stores the acoustic information that has been generated on a basis of the acoustics that have been measured at the location.

12. The acoustic processing apparatus according to claim 1,
wherein the storage unit stores a head related transfer function of the user, and
the processing unit applies for the user, the head related transfer function of the user to convert the acoustic characteristic of the acoustic content.

13. The acoustic processing apparatus according to claim 12,
wherein the storage unit
stores the head-related transfer function that has been derived on a basis of the acoustics that have been sound-recorded by an ear microphone worn by the user.

14. The acoustic processing apparatus according to claim 12,
wherein the storage unit
stores the head-related transfer function that has been derived on a basis of the acoustics in which a sound is recorded by an ear microphone worn by the user in a period while a sound wave characteristic depends on the user, and the acoustics in which a sound is recorded by an ear microphone worn by a doll in a period while a sound wave characteristic depends on the location.

15. The acoustic processing apparatus according to claim 12,
wherein the storage unit
stores the head-related transfer function derived on a basis of an image of an ear of the user.

16. An acoustic processing method to be performed by a computer, the acoustic processing method comprising:
acquiring location information regarding a location viewed by a user who listens to an acoustic content;
storing acoustic information regarding acoustics at the location, and storing a virtual reality entire spherical video of the location; and
converting an acoustic characteristic of the acoustic content into an acoustic characteristic in accordance with the location on a basis of the acoustic information, and regenerating a sound field, and causing the user to visually recognize the virtual reality entire spherical video while regenerating the sound field of the acoustic content;
providing a creator of the acoustic content with the acoustic content, and the virtual reality entire spherical video and the acoustic information of the location in which the sound field of the acoustic content is regenerated,
acquiring the acoustic information that has been changed by the creator, and
storing the acoustic content and the virtual reality entire spherical video of the location at which the sound field of the acoustic content is regenerated, the acoustic content and the virtual reality entire spherical video having been provided for the creator, in association with the acoustic information that has been changed by the creator.

17. A non-transitory computer-readable medium storing an acoustic processing program that, when processed by a processor of a computer, causes the computer to execute:
an acquisition procedure to acquire location information regarding a location viewed by a user who listens to an acoustic content;
a storage procedure to store acoustic information regarding acoustics at the location, and to store a virtual reality entire spherical video of the location;
a processing procedure to convert an acoustic characteristic of the acoustic content into an acoustic characteristic in accordance with the location on a basis of the acoustic information, and to regenerate a sound field, and cause the user to visually recognize the virtual reality entire spherical video while regenerating the sound field of the acoustic content; and
a providing procedure to provide a creator of the acoustic content with the acoustic content, and the virtual reality entire spherical video and the acoustic information of the location in which the sound field of the acoustic content is regenerated,
wherein the acquisition procedure includes acquiring the acoustic information that has been changed by the creator, and the storage procedure includes storing the acoustic content and the virtual reality entire spherical video of the location at which the sound field of the acoustic content is regenerated, the acoustic content and the virtual reality entire spherical video having been provided for the creator, in association with the acoustic information that has been changed by the creator.

\* \* \* \* \*